United States Patent
Väänänen et al.

[11] Patent Number: 6,018,470
[45] Date of Patent: Jan. 25, 2000

[54] METHOD AND ARRANGEMENT FOR PRODUCING OPERATING VOLTAGE

[75] Inventors: Timo Väänänen, Kiiminki; Markku Kallunki, Oulu, both of Finland

[73] Assignee: Nokia Mobile Phones Ltd., Espoo, Finland

[21] Appl. No.: 09/165,673

[22] Filed: Oct. 2, 1998

[30] Foreign Application Priority Data

Oct. 3, 1997 [FR] France ........................................ 973882

[51] Int. Cl.[7] .......................... H02M 1/12; H02M 3/335; H02M 3/24; H02M 7/5387
[52] U.S. Cl. ................................ 363/95; 363/41; 363/17; 363/132
[58] Field of Search ................................. 363/41, 16, 17, 363/26, 95, 97, 131, 132, 134

[56] References Cited

U.S. PATENT DOCUMENTS

| | | | |
|---|---|---|---|
| 4,213,173 | 7/1980 | Link et al. ................................. | 363/163 |
| 4,527,096 | 7/1985 | Kindlmann ........................... | 315/169.3 |
| 4,845,489 | 7/1989 | Hormel .................................... | 340/811 |
| 5,208,494 | 5/1993 | Ikonen et al. ............................ | 307/572 |
| 5,241,284 | 8/1993 | Nyqvist et al. .......................... | 330/297 |
| 5,285,165 | 2/1994 | Renfors et al. .......................... | 328/167 |
| 5,349,269 | 9/1994 | Kimball ................................ | 315/169.3 |
| 5,406,635 | 4/1995 | Jarvinen ..................................... | 381/94 |
| 5,473,530 | 12/1995 | Giuseppe et al. ......................... | 363/131 |
| 5,519,711 | 5/1996 | Sointula ................................... | 370/95.3 |
| 5,566,064 | 10/1996 | Schoenwald et al. ................... | 363/132 |
| 5,682,093 | 10/1997 | Kivela ...................................... | 323/273 |
| 5,699,240 | 12/1997 | Obayashi ................................... | 363/98 |
| 5,742,496 | 4/1998 | Tsutsumi .................................... | 363/95 |
| 5,757,631 | 5/1998 | Semmler ..................................... | 363/41 |

OTHER PUBLICATIONS

Finnish Office Action.

*Primary Examiner*—Peter S. Wong
*Assistant Examiner*—Bao Q. Vu
*Attorney, Agent, or Firm*—Perman & Green, LLP

[57] ABSTRACT

The invention relates to a method and an arrangement for producing an operating voltage of a desired form. A high-voltage operating voltage of a desired form is produced by means of a DC-AC converter. The desired operating voltage is usually a sine voltage. The DC-AC converter is controlled by means of a pulse form control signal of a signal generator, the pulse width of the control signal being controlled by means of a pulse width modulator. To change the pulse width of the control pulses, the operating voltage of a desired form produced by means of the DC-AC converter is compared with a reference signal and a comparator is used for forming a difference signal. The difference signal is used for controlling the pulse width of the control signal of the pulse generator in order to produce the operating voltage of a desired form.

7 Claims, 3 Drawing Sheets

6,018,470

METHOD AND ARRANGEMENT FOR PRODUCING OPERATING VOLTAGE

FIELD OF THE INVENTION

The invention relates to a method and arrangement for producing an operating voltage, a low-voltage control signal of a pulse form being used in the method for producing an operating voltage of a desired form and with a substantially higher voltage than the control signal.

The invention further relates to an arrangement for producing an operating voltage, the arrangement comprising a pulse generator for generating a low-voltage control signal and the arrangement being arranged to use the control signal for producing an operating voltage of a desired form and with a substantially higher voltage than the control signal.

BACKGROUND OF THE INVENTION

Components based on electroluminescence in particular require an alternating current operating voltage, the frequency of which is advantageously hundreds of herzes and effective voltage about 100 V. A typical prior art power source of this kind is disclosed in U.S. Pat. No. 5,566,064, which is enclosed herein as a reference. The solution presented is a component based on electroluminescence controlled by a sine voltage produced by means of a bridge connection. The bridge connection is controlled by means of a pulse width modulated signal. In a typical prior art solution, as also in U.S. Pat. No. 5,566,064, the high-voltage needed is produced by applying first a DC—DC conversion to form a high DC voltage which is converted to an AC voltage by means of switches. Typical drawbacks in the control electronics of the prior art electroluminescent component are both electric and acoustic disturbances and ageing of the electroluminescent component, both due to a distorted control voltage in particular.

SUMMARY OF THE INVENTION

An object of the invention is thus to provide a method and an arrangement implementing the method which allow the above problems to be solved. The invention thus enables the problematic DC-DC conversion and electric and acoustic disturbances to be avoided, and it reduces the ageing of a component by providing a purer operating voltage.

This is achieved with a method described in the preamble, the method being characterized in that a high-voltage operating voltage of a desired form is produced by means of a DC-AC conversion, and, the DC-AC conversion is controlled by means of a pulse form control signal used for changing the pulse width of the control signal. An arrangement of the invention, in turn, is characterized in that the arrangement comprises a DC-AC converter for producing a high-voltage operating voltage of a desired form and that a pulse generator is arranged to use the control signal pulse width to control the DC-AC converter.

The method and arrangement of the invention provide several advantages. The DC-DC conversion being avoided, the arrangement can be implemented by using fewer components and with less power loss. Since the form of the operating voltage is better than in prior art solutions, the inventive solution reduces both electric and acoustic disturbances and the ageing of the component to be used.

BRIEF DESCRIPTION OF THE DRAWINGS

In the following the invention will be described in greater detail in connection with preferred embodiments and with reference to the attached drawings, in which.

DETAILED DESCRIPTION OF THE INVENTION

The solution of the invention for producing a desired operating voltage is particularly well suited for controlling light sources based on electroluminescence. However, the invention is not restricted to this, but it can be used for a number of other applications, particularly for those involving optoelectronics and electronics, in which high-voltage needs to be controlled. The solution of the invention can be applied to cellular radio systems, particularly as a power source of a subscriber terminal. The solution is also well suited as a power source for the backlight of a terminal screen and keypad.

Figure 1:
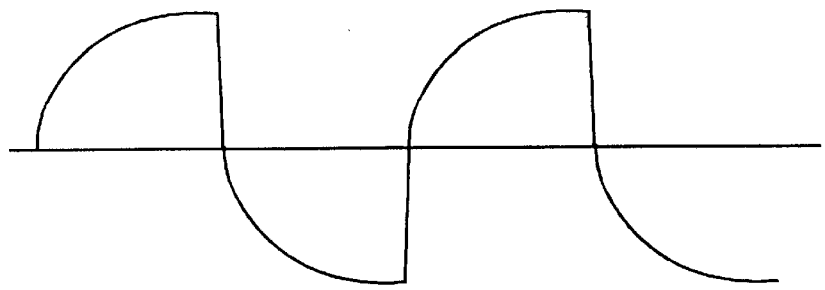
FIG. 1 illustrates a typical waveform of a control voltage of an electroluminescent component.

The most usual prior art power source for producing an AC voltage is a DC-AC converter with a constant pulse ratio. The waveform in this case is, however, typically like the one shown in FIG. 1. The operating voltage of an electroluminescent component in particular should, however, be a purer sine voltage to ensure that disturbances are avoided.

Figure 2:
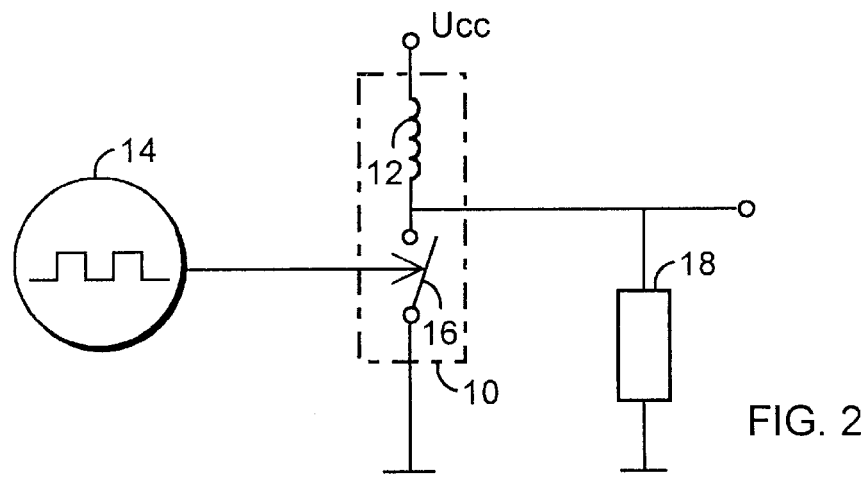
FIG. 2 illustrates a DC-AC converter.

Let us now examine the operation of a DC-AC converter of FIG. 2. A DC-AC converter 10 comprises a coil 12 and a switch 16 which is advantageously an electronic switch, such as a transistor. The switch 16 is controlled by a pulse generator 14. When the pulse generator 14 transmits to the switch 16 a pulse sequence of an even pulse width, the switch 16 opens and closes according to the pulses, the coil 12 and a load resistance 18 then making the voltage over the load resistance 18 to increase higher than the operating voltage $U_{cc}$ of the DC-AC converter. When the pulse ratio of the pulse generator 14 is changed according to a desired function, e.g. a sine function, the DC-AC converter voltage over the load resistance 18 starts to vary according to the function changing the pulse ratio. To provide a corresponding voltage variation, the pulse frequency can also be changed without changing the pulse ratio. An AC voltage over the load resistance and changing for instance according to a sine function is thereby obtained. When a load impedance is used instead of the load resistance 18, the voltage variation over the load impedance, however, no longer represents a desired function, but the form of the voltage is distorted.

Figure 3:
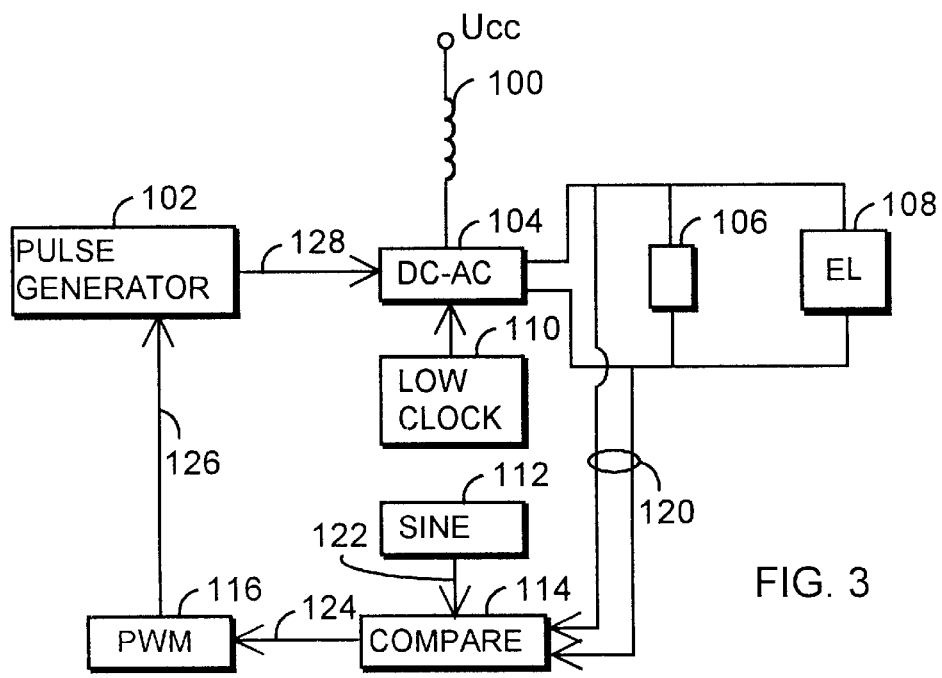
FIG. 3 illustrates an arrangement for providing an operating voltage of a desired form.

An arrangement according to FIG. 3 comprises a coil 100, a pulse generator 102, a DC-AC converter 104, a resistance 106, a component 108 to be used, timing means 110, means 112 for producing a reference, a comparator 114 and a pulse modulator 116. Let us first examine the operation of the arrangement without feedback coupling, which is formed of the parts 112–116. The component 108 to be used is advantageously a light source based on electroluminescence, an equivalent circuit for the light source being provided by a shunt connection of resistance and capacitance. The DC-AC converter 104, the operation of which is based on the electronic switch 16 of FIG. 2 functioning as a chopper, preferably converts its low DC operating voltage, which typically varies from 1 V to 10 V, to high AC voltage. The effective value of the AC voltage is advantageously from 50 Vrms to 200 Vrms and its frequency is from 100 Hz to 1000 Hz. The DC-AC converter is controlled by means of the pulse generator 102 which feeds to the DC-AC converter 104 a pulse sequence 128 of a varying pulse width, as also in FIG. 1. The timing means 110 are meant to reverse the polarity of the DC-AC converter, to allow the DC component to be cancelled from the AC voltage. The resistor 106 is meant to empty the charge stored in the component 108 to be used.

Let us now examine more in detail the impact of feedback coupling in the inventive solution. In feedback coupling, the form of an output voltage 120 of the DC-AC converter, i.e. the form of the operating voltage of a desired form, is compared with the form of the reference voltage 122 by means of the comparator 114, which is advantageously a summer, a correlator or a multiplier. When the comparator 114 is a summer, the output voltage 120 and a reference signal 122 are summed together to provide for the two an amplitude of an equal size and a phase shift of 180° between the output voltage 120 and the reference signal 122, the output voltage 120 and the reference signal being effectively subtracted from each other. The output voltage amplitude can be made equal to the reference signal amplitude by using for instance a voltage divider at the DC-AC converter output. The simplest way to provide a voltage divider is to use two resistors operationally coupled between the ground and the terminal of the component 108 to be used, a sample of the output voltage 120, with an attenuated amplitude, being taken between the resistors to the summer 114.

When the comparator 114 is a correlator, the output voltage 120 does not necessarily need to be attenuated to the same level as the reference signal 122. The correlator 114 compares the output voltage 120 and the reference voltage 122 with each other either analogously or digitally, substantially on the basis of the following formula:

$$C(\tau) = \int x(t) \cdot y(t-\tau) dt \qquad (1)$$

where x(t) is for example the signal 120 and y(t−τ) is the signal 122 delayed for the duration of τ. A difference signal 124 of the correlator 114 is effectively the smaller the more the output signal 120 and the reference signal differ from each other.

The comparator 114 can be a multiplier, i.e. a mixer, when a sine-form output signal is to be provided. A prior art mixer 114 generates sine-form signals, the frequencies of which are a summation frequency and a difference frequency of the output signal and the reference signal. The summation frequency is filtered away from these frequencies, thus leaving the difference frequency. The multiplication of sine-form signals can be expressed by the following formula: $\sin(f_1)*\sin(f_2)=\frac{1}{2}*\cos(f_1-f_2)-\frac{1}{2}*\cos(f_1-f_2)$. After filtering, $K*\cos(f_1-f_2)$ remains. The difference signal 124 of the mixer 114 is then effectively the smaller the more uniform the output signal 120 and the reference signal 122 are.

The difference signal 124 controls the pulse width modulator 116, which changes, i.e. distorts, a predetermined pulse width function to ensure that the difference between the output signal 120 and the reference signal 122 would be as small as possible. The pulse width modulator 116 controls the pulse generator 102 to change its pulse width to provide an DC-AC converter output as close as possible to the form of the reference signal 122.

Figure 4:
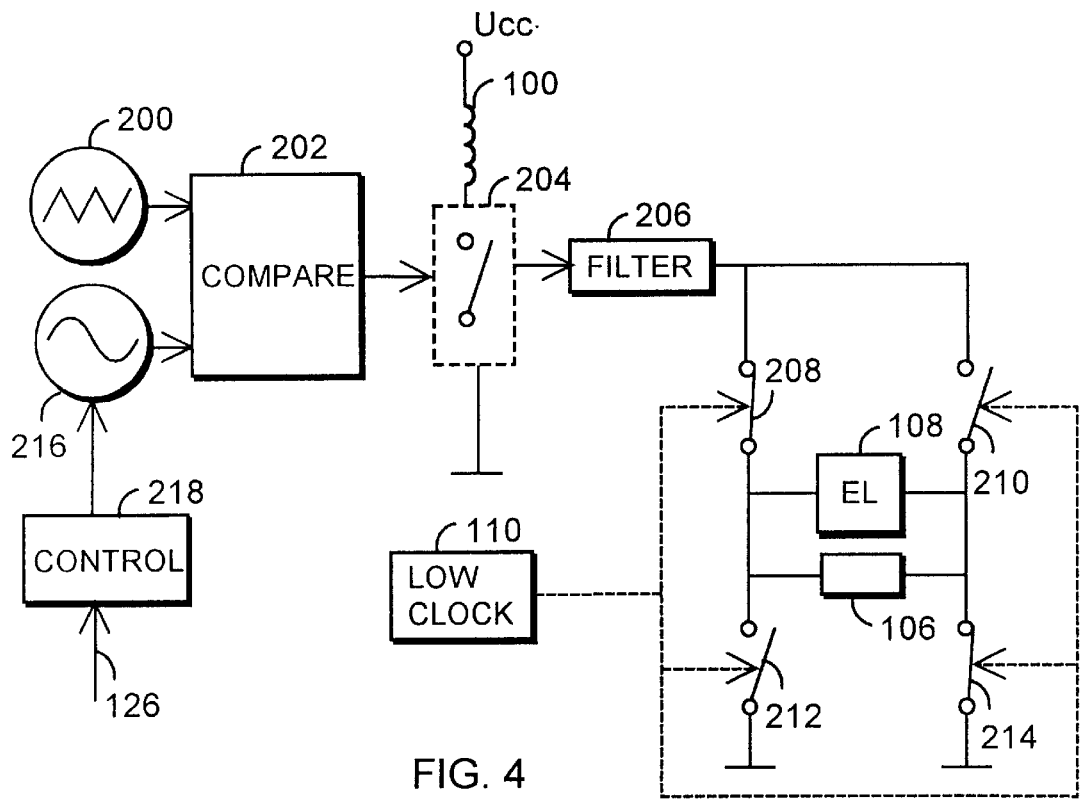
FIG. 4 illustrates a control arrangement of a light source based on electroluminescence.

FIG. 4 shows the inventive solution in slightly greater detail. The solution comprises a coil 100, a resistor 106, a component 108 to be used, timing means 110, a saw tooth generator 200, a comparator 202, a switch 204, a filter 206, switches 208–214, a sine wave generator 216 and a drive unit 218. The saw tooth generator 200 operates at a frequency of for instance 40 kHz and the sine wave generator at a frequency of for instance 500 Hz. According to the prior art, the output signal of the comparator is in this case pulse width modulated in a sine form. The pulse width modulated signal controls the switch 204, which generates a rectified sine-like voltage signal. A signal received from the switch 204 is advantageously filtered in a filter 206. To the component 108 to be used is then fed a fully sine-like control voltage from the switches 208–214. The switches 208–214 are controlled by changing their polarity in such a way that every second half-cycle of a rectified sine is reversed, a sine form voltage without a DC component thus being formed. The components 200, 202, 216 and 218 form a pulse generator 102 which receives pulse ratio change data 126 from the pulse modulator 116. The pulse ratio change data is used for changing for instance a signal generated by the sine generator 218 in such a way that the component 108 to be used receives a sine signal which is as pure as possible.

In the inventive solution the difference signal 124 arriving from the comparator 114 is used for controlling the pulse modulator 116 to reduce the pulse width of the pulse form signal 128 leaving the pulse generator 102 when the difference between the reference signal 122 and the operating voltage 120 of a desired form grows. This allows particularly the leading edge of the first quarter of the sine output voltage 120 leaving the AC-DC converter 104 and the trailing edge of the third quarter to be rounded according to a sine form.

The switches 16, 204, 208–214 of the invention are electronic switches such as transistors.

Figure 5:
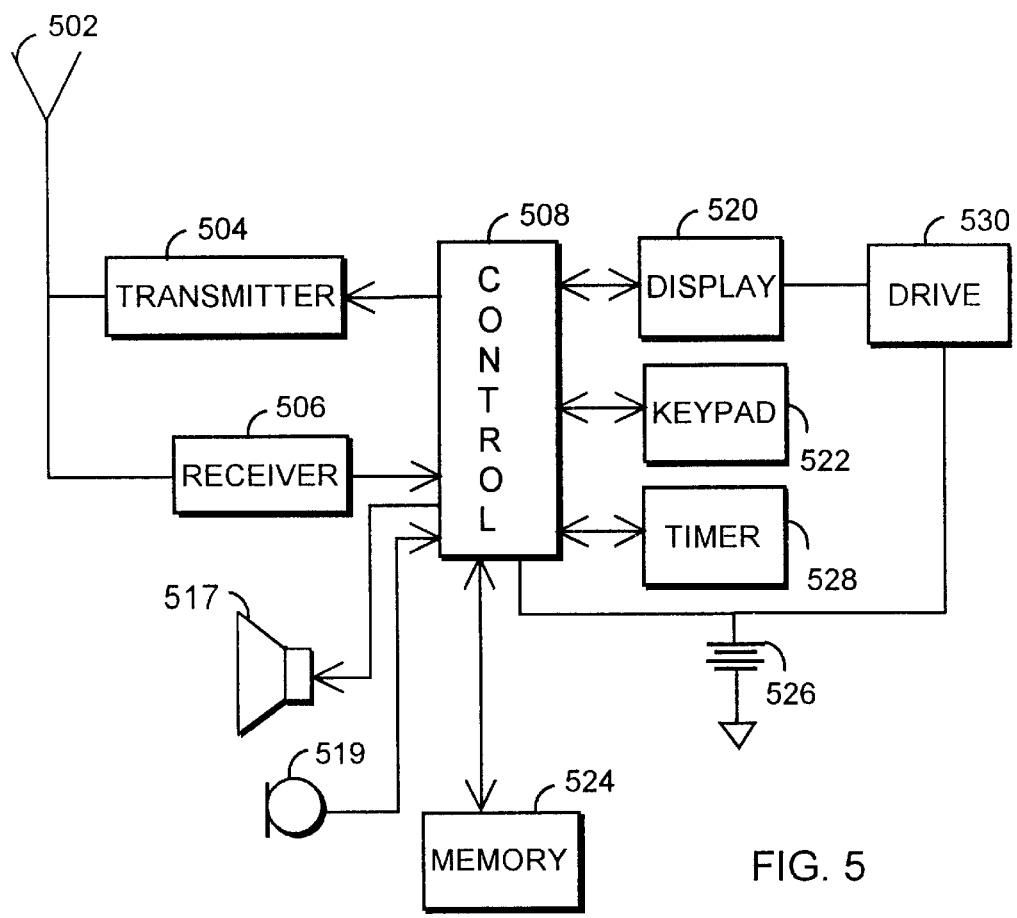
FIG. 5 is a block diagram illustrating a terminal.

FIG. 5 illustrates a block diagram of a mobile phone of a cellular radio system. The mobile phone relating to the invention comprises a common antenna 502 for a transmitter 504 and a receiver 506, a controller 508, a loudspeaker 517, a microphone 519, a display 520, a keypad 522, a memory 524, a power source 526, a timer 528 and a display power source 530. The antenna 502 of the mobile phone transmits and receives signals, the destination or source of which is a base station of the radio system. The mobile phone transmitter 504 typically comprises a modulator, which performs digital signal processing, and radio frequency parts, in which a signal is multiplied and filtered so as to be transferred to a radio frequency determined by a carrier wave. The receiver 506, in turn, transfers a received radio frequency signal to an intermediate frequency and a demodulator of the receiver 506 forms digital symbols of an analogous signal of the intermediate frequency. The controller 508 provides other digital signal processing needed. At the same time the controller 508 also controls the operation of several other blocks. The loudspeaker 517 is a prior art loudspeaker from which the user hears for instance the voice of the other user. The microphone 519, in turn, is used in a previously known manner for transmitting the voice of the user. The memory 524 is needed for instance for storing the software controlling the operation of the mobile phone. With the keypad 522 the user controls the mobile phone. The timer 528 interrupts the controller 508 in a prior art manner if a predetermined time limit for an operation is exceeded. The power source 526, in turn, provides the electricity supply needed by the mobile phone. The power source 526 is preferably a rechargeable battery. The display 520 can display to the user, in a known manner, a plural number of different data concerning for instance the status of the mobile phone and phone numbers. The display 520 of the mobile phone is advantageously an electroluminescent display to which a suitable AC voltage is fed from the power source 530 based on the DC-AC conversion. The power source 530 receives the DC voltage advantageously from the mobile phone power source 526.

Figure 6:
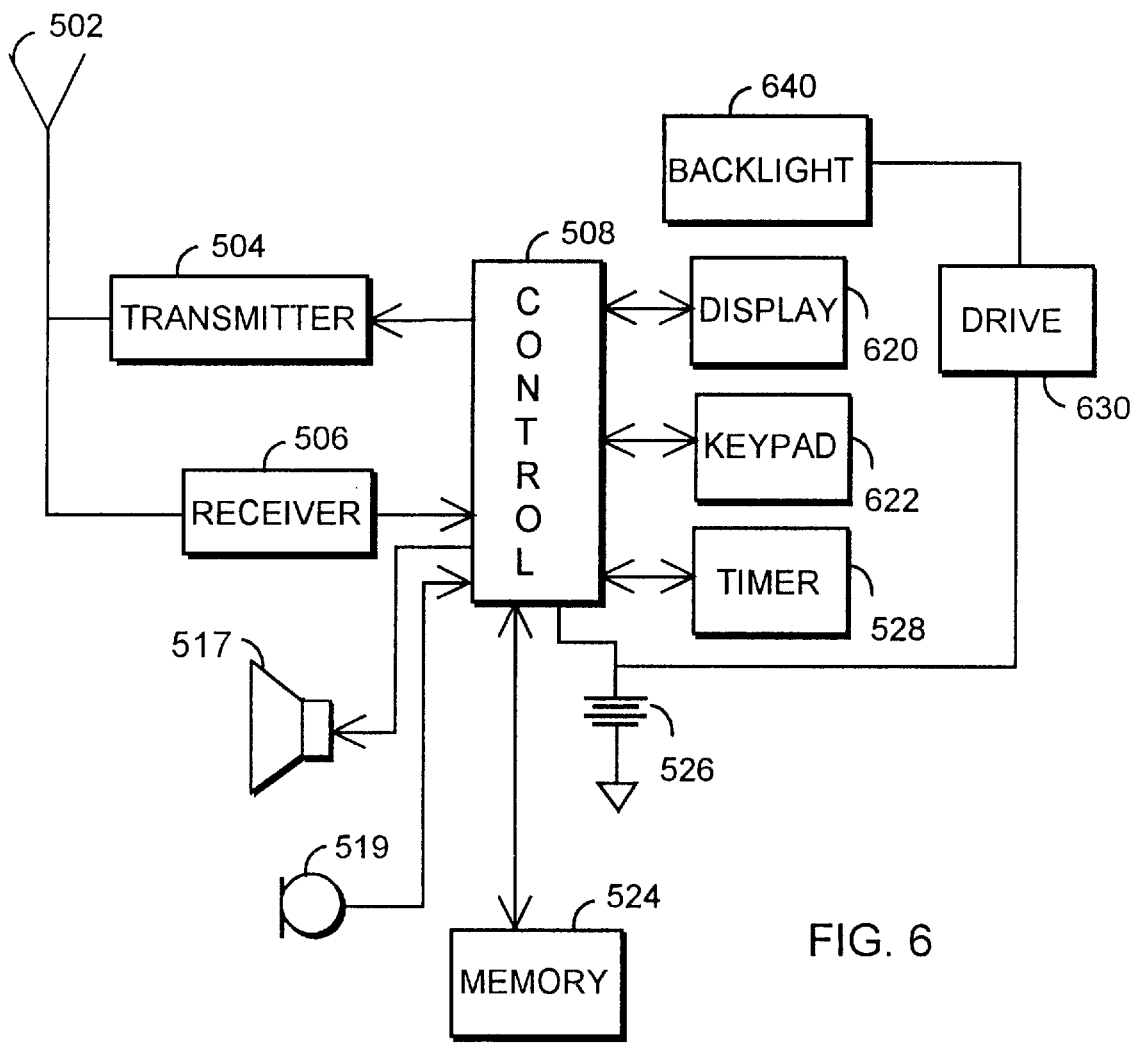
FIG. 6 is a block diagram illustrating a terminal.

FIG. 6 shows a block diagram closely similar to the one shown in FIG. 5. They differ, however, in that a power source 630 of the invention controls a backlight 640 of a display 620 and/or a keypad 622, the backlight being advantageously an electroluminescent component. The backlight is meant to illuminate the display 620 and/or the keypad 622 to allow the user to see their indications also in the dark. The display 620 can in this solution be for instance a liquid crystal display the readability of which the backlight particularly improves.

Even though the invention is described above with reference to an example shown in the attached drawings, it is apparent that the invention is not restricted to it, but can vary in many ways within the inventive idea disclosed in the attached claims.

The invention claimed is:

1. A method for producing a sine operating voltage, the method comprising the steps of:

generating a low-voltage control signal of a pulse form;

producing a sine operating voltage having a substantially higher voltage than the control signal, by means of a DC-AC conversion of said control signal;

controlling said DC-AC conversion step by changing the pulse width of the control signal;

comparing said sine operating voltage produced using the DC-AC conversion with a reference signal and on the basis of the comparison generating a difference signal; and wherein the difference signal is used for changing the pulse width of the control signal in such a way that, as the difference between the reference signal and the sine operating voltage grows, the pulse width of the control signal is reduced.

2. A method according to claim 1, wherein the comparison generates the difference signal as a difference of, a correlation between or a product of the reference signal and the sine operating voltage.

3. A method according to claim 1, wherein the pulse width of the control signal is changed at the leading first quarter and at the trailing third quarter of the sine operating voltage.

4. A method according to claim 1, wherein the sine operating voltage is used as the operating voltage of a light source based on electroluminescence.

5. An arrangement for producing a sine operating voltage, the arrangement comprising:

a pulse generator for generating a low-voltage control signal for producing a sine operating voltage with a substantially higher voltage than the control signal;

a DC-AC converter for producing a high-voltage sine operating voltage in response to said control signal wherein said DC-AC converter is controlled by changing the pulse width of said control signal; and wherein, the arrangement further comprises: means for generating a reference signal; a comparator for comparing the sine operating voltage with the reference signal and for generating, on the basis of the comparison, a difference signal; and a pulse modulator, which is arranged to reduce the pulse width of the control signal as the difference between the reference signal and the sine operating voltage grows.

6. An arrangement according to claim 5, wherein the comparator is a summer, a correlator or a mixer, which is arranged to generate the difference signal as a difference of, a correlation between or a product of the reference signal and the sine operating voltage.

7. An arrangement according claim 5, wherein the pulse generator is arranged to use the pulse width to control the leading first quarter and trailing third quarter of the sine operating voltage.

\* \* \* \* \*

UNITED STATES PATENT AND TRADEMARK OFFICE
CERTIFICATE OF CORRECTION

PATENT NO. : 6,018,470
DATED : January 25, 2000
INVENTOR(S) : Timo Vaananen, et al.

It is certified that error appears in the above-indentified patent and that said Letters Patent is hereby corrected as shown below:

On the title page, item [75] inventors should read--

Timo Tarvainen    Oulu, Finland
    Pekka Paakkonen    Jaali, Finland --.

The foreign country listed in Foreign Application Priority Data on cover of Letters Patent should read "Finland"

Signed and Sealed this

Twenty-seventh Day of March, 2001

Attest:

NICHOLAS P. GODICI

*Attesting Officer*    *Acting Director of the United States Patent and Trademark Office*